United States Patent Office 3,251,831
Patented May 17, 1966

3,251,831
DIHYDROSCHIZOZYGIN AND PROCESS FOR PRODUCING THE SAME
Ulrich Renner, Riehen, near Basel, Switzerland, assignor to Geigy Chemical Corporation, Greenburgh, N.Y., a corporation of Delaware
No Drawing. Filed June 12, 1963, Ser. No. 287,223
Claims priority, application Switzerland, June 14, 1962, 7,175/62; Feb. 13, 1963, 1,774/63
7 Claims. (Cl. 260—293.4)

This invention relates to dihydroschizozygin and to a process for producing the same.

It has been found that a good yield of an alkaloid mixture can be extracted from parts, particularly from the roots and bark, of *Schizozygia caffaeoides* (Boj.) Baill., which belongs to the Apocynaceae family and grows in East Africa. This alkaloid mixture consists chiefly of a previously unknown, uniform alkaloid that can be crystallized, which will now be termed schizozygin and which has valuable therapeutical properties. Its antipyretic and bronchospasmolytic action are particularly marked; that it also has an action on the central nervous system can be seen from its anaesthesia and analgesics potentiating effect.

As extracting agents there can be used either polar solvents such as lower alkanols with at most three carbon atoms, if necessary with addition of an alkanoic acid with at most three carbon atoms, or non-polar or weakly polar solvents such as chloroform, methylene chloride or benzene, respectively, or ether-type solvents such as diethyl ether, dibutyl ether, dioxan or tetrahydrofuran, in the presence of water and, if necessary, in the presence of a weak inorganic or organic base.

On using polar solvents, the schizozygin is extracted partially as such and particularly as salt of the acids which are present in the plant material, and on addition of low alkanoic acids as salt of the latter. The presence of water and, optionally, of an inorganic base such as sodium bicarbonate, sodium acetate, sodium or potassium carbonate, calcium hydroxide or ammonia or an organic base which boils below 100°, e.g. trimethyl amine or triethyl amine, i.e. the moistening of the plant material with water or with aqueous solutions of suitable bases before extraction with at most weak polar solvents brings about the hydrolysis of the salts of schizozygin, which are present in the plant, or liberates schizozygin from its salts respectively and thus permits its extraction of the free base.

The extraction of schizozygin can be performed e.g. according to the process which is described in detail in the following.

Ground and dried parts, particularly the roots and bark of the trunk of *Schizozygia caffaeoides*, are extracted with an alkanol containing 1–3 carbon atoms, optionally with the addition of an alkanoic acid containing 1–3 carbon atoms, such as acetic acid in amounts up to 1% by volume, the extract is concentrated under reduced pressure, diluted with water, optionally with the addition of an alkanoic acid containing 1–3 carbon atoms, and the alkanol is completely distilled off under reduced pressure. An acid to neutral aqueous phase containing chlorine ions, in particular concentrated hydrochloric acid or an aqueous solution of an alkali or alkaline earth metal chloride is added to the acid aqueous solution of the alkaloid mixture which remains, preferably after clarification of the latter by filtration over a little kieselguhr, the crude schizozygin hydrochloride which precipitates is separated and the base is liberated, e.g. by treatment of the hydrochloride with ammonia or with an aqueous solution of an alkali or earth alkali hydroxide. The schizozygin obtained can be purified, e.g. by recrystallization from methanol; if desired, the crude hydrochloride can also be even previously purified, e.g. by crystallization from a low alkanol.

Instead of precipitating the schizozygin as hydrochloride from the acid aqueous solution of the alkaloid mixture, it can also be precipitated as such from this solution. This is done preferably by first clarifying this solution by filtration over a little kieselguhr, and then bringing the pH of the solution to 8–10, e.g. by the addition of ammonia or an aqueous solution of an alkali or earth alkali hydroxide or carbonate. The precipitated mixture of alkaloids is isolated, e.g. by filtration or centrifugation and the schizozygin is obtained therefrom by crystallization from an alkanol containing 1–3 carbon atoms.

In order to extract the schizozygin by a different mode of operation, the ground parts of the plant of *Schizozygia caffaeoides* are first moistened with a diluted aqueous sodium carbonate solution, i.e. the material can be sprayed and mixed well. The plant material treated in this way is extracted e.g. with chloroform, the chloroform extract is concentrated and then methanol is added which causes the schizozygin to crystallize out. The schizozygin obtained by the process according to the invention crystallizes from chloroform/methanol in colorless needles which melt at 192–194°; $[\alpha]_D^{23}$ +15.5° (c.=1, chloroform).

Elementary analysis shows that it has the formula $C_{20}H_{20}O_3N_2$—

Calculated: C, 71.42; H, 5.99; N, 8.33. Found: C, 71.52, 71.40; H, 6.21, 6.18; N, 8.36.

Group analyses for $OCH_3$, $NCH_3$ and $C—CH_3$ are negative, the Labat test for the presence of the grouping

is positive.

The ultra-violet spectrum in methanol has maxima at 208 m$\mu$ (log $\epsilon$ 4.38), 269 m$\mu$ (log $\epsilon$ 3.99) and 313 m$\mu$ (log $\epsilon$ 3.97). In the short wave range of the infra-red spectrum (in KBr) there is a strong band at 6.05$\mu$ ($>C=O$ lactam).

Schizozygin hydrochloride can be obtained either direct according to the process of the invention or by the addition of hydrochloric acid to an acetic acid or alcoholic solution of schizozygin. From methanol it crystallises in needles which melt at over 250° (under carbonisation). Other salts with inorganic or organic acids can be obtained in an analogous manner. Schizozygin perchlorate crystallises from methanol in colourless needles which melt at 252–255° (with decomposition).

On reacting schizozygin with methyl iodide, a methoiodide is obtained which crystallises as colourless leaflets from methanol which decompose at over 280° under carbonisation.

Catalytic hydrogenation of the methochloride produced from the above methoiodide (Emde-degradation), with the take-up of about double the molar amount of hydrogen, produces a tertiary base and, on oxidising this with chromic acid, butyric acid among others is obtained.

In the presence of platinum catalyst, schizozygin absorbs a substantially equimolar amount of hydrogen and loses a double bond. A tetrahydro derivative is formed as side product which, in contrast to schizozygin and dihydro schizozygin, contains an NH group and a $CH_3$ group bound to a carbon atom.

Finally, a ditertiary base is obtained on reduction of schizozygin by means of lithium aluminium hydride. In 80% 2-methoxyethanol, a PK value of 4.29 was found for schizozygin.

From the spectra, group analyses, the Labat test and the above degradation reactions, the following Formula I results for schizozygin:

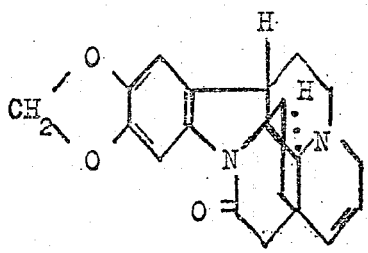

As expected, Hofmann degradation of the methoiodide mentioned above with potassium tert. butylate, produced a tertiary amine with an additional double bond. This shows a proton resonance spectrum, the signs of which confirm the above Formula I because they can be completely correlated to a 3-vinyl indoline derivative, derived from Formula II below, in which formula the τ-values (s=singlet, d=doublet) attributed to the various protons are given:

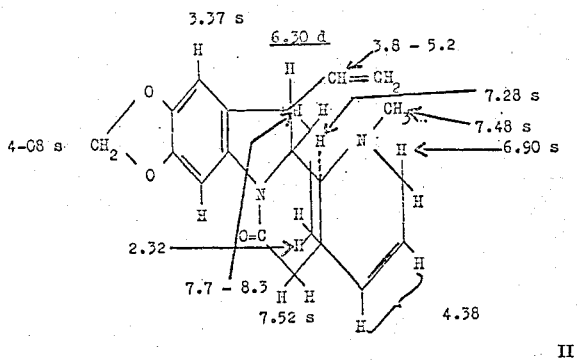

If the 3-vinyl indoline derivative of Formula II is treated with potassium tert. butylate, then an isomer is obtained which, already in the Hofmann degradation reaction, is also found as by-product and which, moreover, is characterised by an extended chromophoric system with UV maxima at 230, 298, 333 and 346 mμ corresponding to a double bond conjugated with the benzene nucleus. It contains a methyl group appearing in the resonance spectrum with a doublet at τ=7.95, which can also be traced according to Kuhn-Roth. The vinyl radical in the 3-position of the indole nucleus can thus be rearranged to form the 3-ethylidene group which increases the probability of the accuracy of Formulae I and II. In this connection, it is pointed out that in the Hofmann degradation of the methoiodide, the assumption that the unsaturated 6-membered ring containing an allylamine grouping is split, can be excluded because the Emde degradation process which, in this case, is possible only if there is an allylamine group, can be performed with the product of the Hofmann degradation process, i.e. identical products are obtained if, on the one hand, the 3-vinyl indoline derivative, of Formula II, is again quaternised and then hydrogenated (degradation according to Emde and hydrogenation of the vinyl group) and, on the other hand, the degradation product of scrizozygin according to Emde is quaternised, degraded according to Hofmann and the product obtained is hydrogenated.

Furthermore, a compound which is distinguished from the compound of Formula I by a much greater centrally active component in the form of an unexpectedly higher anaesthesia potentiating action and lack of bronchospasmolytic action can be obtained if schizozygin of the general Formula I given above is catalytically hydrogenated until substantially an equimolar amount of hydrogen is taken up and the compound of formula

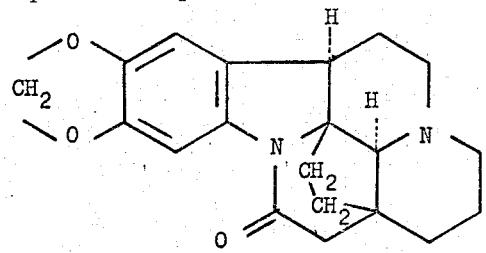

which is termed dihydro-schizozygin in the following, is isolated as such or as salt with an inorganic or organic acid. The hydrogenation is performed, for example, in the presence of platinum oxide according to Adams in glacial acetic acid or in the presence of Raney nickel in dioxan, the take-up of hydrogen ceasing, at room temperature under normal pressure, when the equimolar amount has been used. Dihydro-schizozygin can be purified, e.g. by crystallisation from ether.

A preferred process for the production of the compound of the formula

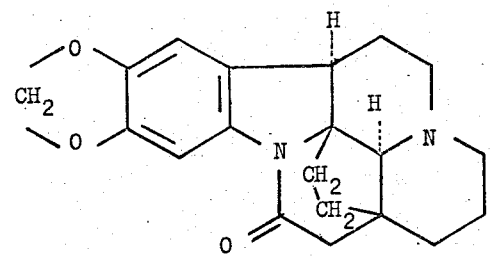

in practice comprises the steps of
(a) Extracting bark of *Schizozygia caffaeoides* with an alcohol selected from the group consisting of methanol and ethanol,
(b) Acidifying the resulting alcoholic extract with a dilute aqueous to concentrated acetic acid of from about 5 to 100% strength and separating the liquid from the resulting solid phase,
(c) Adjusting the pH of the resulting acidified liquid phase to about 10,
(d) Separating the resulting precipitate from the mother liquor,
(e) Dissolving the precipitate in a hot alcohol selected from the group consisting of methanol and ethanol,
(f) Cooling the resulting alcoholic solution, whereby a product having a melting point of 190–192° C. crystallizes, and separating the latter from the mother liquor,
(g) Dissolving the said crystalline product in glacial acetic acid and hydrogenating the dissolved product with hydrogen in the presence of a platinum oxide hydrogenation catalyst at room temperature, and
(h) Recovering the resulting hydrogenation product of Formula III from the hydrogenation mixture.

As mentioned hereinbefore, either stem bark or root bark is used as starting material in step (a).

Methanol is the preferred solvent in steps (a) and (e). In step (c) the pH is adjusted to 10 by adding to the said acidified mixture a base selected from the group consisting of ammonia, alkali metal hydroxide, alkali metal carbonate and alkali metal hydrogen carbonate.

Both schizozygin and dihydro-schizozygin form monoacidic salts with inorganic and organic acids, such as hydrochloric acid, hydrobromic acid, sulfuric acid, phosphoric acid, methane sulfonic acid, acetic acid, lactic acid, oxalic acid, succinic acid, fumaric acid, maleic acid, malic acid, tartaric acid, citric acid, benzoic acid, salicyclic acid, phenyl acetic acid and with mandelic acid.

The following examples further illustrate the processes according to the invention but are by no means the only methods of performing the same. The parts are given as parts by weight; their relationship to parts by volume is as that of grams to cubic centimeters. The temperatures are given in degrees centigrade. Percentages are by weight.

Example 1

7000 parts of ground bark from the trunk of *Schizozgia caffaeoides* are exhaustively extracted with 30,000 parts by volume of absolute methanol, the extract is concentrated in vacuo to about 2,000 parts by volume, about 3,000 parts by volume of aqueous 10% acetic acid are added and the remaining methanol is distilled off in vacuo. The solution which remains is clarified by filtration over kieselguhr, brought to a pH of about 10 with ammonia and the precipitated mixture of the crude product (153 parts) is filtered off under suction. This is washed with water and taken up in hot methanol. 77 parts of schizozygin crystallize, M.P. 190–192°. To produce the hydrochloride, 1 part of schizozygin is dissolved in 20 parts of 2 N acetic acid and, while cooling and stirring, 2 parts by volume of concentrated hydrochloric acid are added to the solution. The precipitated hydrochloride is filtered off and crystallised from methanol. 1 part of schizozygin hydrochloride is obtained. It decomposes above 250° with carbonisation.

Example 2

500 parts of finely ground bark from the roots of *Schizozygia caffaeoides* are extracted three times while stirring with 2,000 parts by volume of methanol each time. The methanolic extract is concentrated in vacuo to 100 parts by volume and then diluted with aqueous 1 N acetic acid to 100 parts by volume. The acid solution is filtered over a little kieselguhr, brought to pH 10 with concentrated ammonia and the precipitate is filtered off. The residue is washed with water, dried and crystallised from 30 parts by volume of methanol whereupon 4 parts of schizozygin are obtained. In the extraction the same amount of ethanol can be used instead of methanol.

Example 3

500 parts of finely ground bark from the roots of *Schizozygia caffaeoides* are extracted three times while stirring with 2,000 parts by volume of absolute methanol each time. The methanolic extract is concentrated to 100 parts by volume in vacuo and taken up in 300 parts by volume of aqueous 2 N acetic acid. The acid solution is filtered over a little kieselguhr and 50 parts by volume of concentrated hydrochloric acid are added. After 24 hours, about 7 parts of crude schizozygin hydrochloride separate as a dark red resinous product. This filtered off, dissolved in water, ammonia is added to the solution until the reaction is alkaline, the precipitated bases are removed by filtration and the schizozygin is obtained therefrom by crystallisation from methanol.

Example 4

500 parts of the ground bark from the trunk of *Schizozygia caffaeoides* are percolated with 3,000 parts by volume of methanol which contains 15 parts by volume of acetic acid. After concentrating the extract in vacuo to about 100 parts by volume, it is diluted with 1,000 parts by volume of water, the solution obtained is clarified by filtration over kieselguhr, the pH is brought to about 10 with 2 N sodium hydroxide solution and the crude alkaloids are filtered off under suction. These are washed with water and crystallised from methanol. 5 parts of schizozygin are obtained. M.P. 191–193°.

Example 5

500 parts of ground bark from the roots of *Schizozygia caffaeoides* are sprayed with a 1% solution of sodium carbonate and mixed well. The drug material prepared in this way is then percolated with 5,000 parts by volume of chloroform. The chloroform extract is concentrated in vacuo to ca. 50 parts by volume and 100 parts by volume of hot methanol are added. On cooling, 3.5 parts of schizozygin crystallise out.

Example 6

4 parts of schizozygin are dissloved in 100 parts by volume of glacial acetic acid and the solution is hydrogenated in the presence of 0.5 part of platinum oxide according to Adams at 25° and a pressure of 746 Torr until no more hydrogen is taken up. (Hydrogen absorption: 314 parts by volume.) After filtering off the catalyst and washing with a little water, the filtrate is diluted with 200 parts by volume of water, made alkaline wtih ammonia and extracted three times with 100 parts by volume of ether each time. The ether extracts are combined, dried with sodium sulphate, evaporated to dryness and the residue is crystallised from ether. 3.2 parts of di-hydro-schizozygin are obtained. M.P. 190–191°, $[\alpha]_D^{24} + 29.4°$ (in chloroform; c.=1).

For the production of the tartrate 1 part of dihydro-schizozygin is dissolved in 10 parts of methylene chloride and an equivalent amount of 1 N alcoholic tartaric acid is added. Then the solution is concentrated to dryness.

Example 7

3.36 parts of schizozygin are dissolved in 250 parts by volume of dioxan and hydrogenated in the presence of 2.5 parts of Raney nickel at 20° and normal pressure (744 mm. Hg). After ca. 21 hours no further hydrogen is taken up. The catalyst is filtered off, the filtrate is concentrated to dryness and the residue is crystallised from ether. 2.5 parts of dihydro-schizozygin are obtained, M.P. 189–191°.

I claim:

1. The compound of the formula

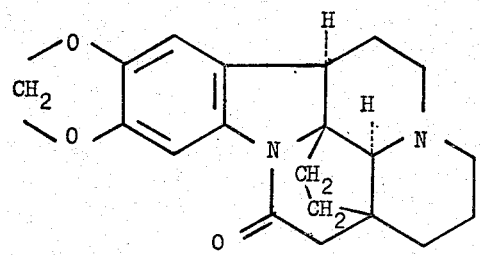

2. A salt of the compound of the formula

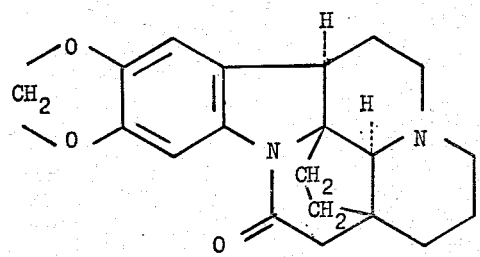

with a pharmaceutically acceptable acid.

3. A process for the production of the compound of the Formula III

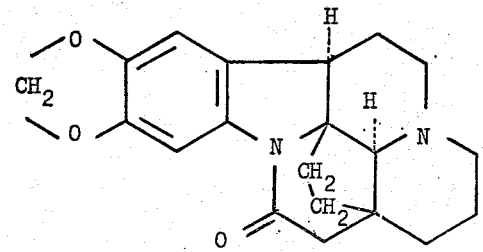

comprising
 (a) extracting bark of *Schizozygia caffaeoides* with an alcohol selected from the group consisting of methanol and ethanol, (b) acidifying the resulting alcoholic extract with a dilute aqueous to concentrate acetic acid of from about 5 to 100% strength, and separating the liquid from the resulting solid phase,
(c) adjusting the pH of the resulting acidified liquid phase to about 10,
(d) separating the resulting precipitate from the mother liquor,
(e) dissolving the precipitate in a hot alcohol selected from the group consisting of methanol and ethanol,
(f) cooling the resulting alcoholic solution, whereby a product having a melting point of 190°–192° crystallises, and separating the latter from the mother liquor,
(g) dissolving the said crystalline product in glacial acetic acid and hydrogenating the dissolved product with hydrogen in the presence of a platinum oxide hydrogenation catalyst at room temperature, and
(h) recovering the resulting hydrogenation product of Formula III from the hydrogenation mixture.

4. A process as described in claim 3 wherein the bark used in step (a) is ground stem bark.

5. A process as described in claim 3 wherein the bark used in step (a) is ground root bark.

6. A process as described in claim 3 wherein the pH is adjusted in step (c) by adding to the said acidified mixture a base selected from the group consisting of ammonia, alkali metal hydroxide, alkali metal hydrogen carbonate and alkali metal carbonate.

7. A process as described in claim 3 wherein the solvent used in steps (a) an d(e) is methanol.

No references cited.

HENRY R. JILES, *Acting Primary Examiner*